United States Patent [19]

Barbee et al.

[11] Patent Number: 4,518,763

[45] Date of Patent: May 21, 1985

[54] COPOLYESTERS FROM ETHER-CONTAINING GLYCOLS AND ACIDS

[75] Inventors: Robert B. Barbee; Burns Davis, both of Kingsport, Tenn.

[73] Assignee: Eastman Kodak Company, Rochester, N.Y.

[21] Appl. No.: 612,513

[22] Filed: May 21, 1984

Related U.S. Application Data

[63] Continuation-in-part of Ser. No. 570,146, Jan. 12, 1984, abandoned.

[51] Int. Cl.$^3$ .................. C08G 63/66; C08G 63/68
[52] U.S. Cl. .................................. 528/173; 528/176; 528/193; 528/194; 528/206; 528/208; 528/209; 528/288; 528/290; 528/291; 528/292; 528/293; 528/294; 528/295

[58] Field of Search ............... 528/173, 176, 193, 194, 528/206, 208, 209, 288, 290, 291, 292, 293, 294, 295

[56] References Cited

U.S. PATENT DOCUMENTS 4,426,512  1/1984  Barbee et al. ..................... 528/209
4,440,922  4/1984  Barbee et al. ..................... 528/194

Primary Examiner—Lester L. Lee
Attorney, Agent, or Firm—John F. Stevens; William P. Heath, Jr.

[57] ABSTRACT

Disclosed are polyesters prepared from hetero-atom-containing dicarboxylic acids and hetero-atom-containing diols. These polyesters have low permeability to oxygen and carbon dioxide and are useful in packaging applications such as for food and beverages.

11 Claims, No Drawings

COPOLYESTERS FROM ETHER-CONTAINING GLYCOLS AND ACIDS

This application is a continuation-in-part of application Ser. No. 570,146 filed Jan. 12, 1984 and now abandoned.

TECHNICAL FIELD

This invention relates to polyesters prepared from hetero-atom-containing dicarboxylic acids and hetero-atom-containing diols. These polyesters have low permeability to oxygen and carbon dioxide and are useful in packaging applications such as for food and beverages.

BACKGROUND

The polyesters according to this invention are prepared from ether-containing dicarboxylic acids and ether-containing glycols. These polyesters have low permeability to oxygen and carbon dioxide and are useful in molded and extruded objects such as bottles and film for packaging food and beverages. They can also be used as gas barrier layers in multilayer film or sheet that can be prepared by one of several techniques such as coextrusion or lamination.

U.S. Pat. Nos. 3,408,334 and 3,522,328 describe polyamides prepared from p-phenylenedioxydiacetic acid. Makromolecular Chem., 32, 1 (1959) also describes this acid. U.S. Pat. Nos. 2,973,339, 3,558,557, 4,188,353, 4,384,106, and 4,398,017 disclose polyesters prepared using hetero-atom-containing diols but not hetero-atom-containing dicarboxylic acids.

DISCLOSURE OF THE INVENTION

The polyesters according to this invention contain 100 mole % of a dicarboxylic acid component and 100 mole % of a diol component.

The hetero-atom-containing dicarboxylic acids useful in the subject invention have the following general structure:

$$HO_2CH_2CX(RX)_yCH_2CO_2H$$

wherein Y=zero or one.

The hetero-atom-containing diols useful in the subject invention have the following general structure:

$$HOCH_2CH_2XRXCH_2CH_2OH$$

R in each of the dicarboxylic acid formula and glycol formula is an aromatic moiety comprising 6 to 24 carbon atoms, and X in each of the above formulas is $$-O-, -S-, \text{ or } \underset{H}{N}$$

Preferably, R is one of the following structures:

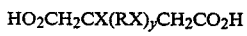

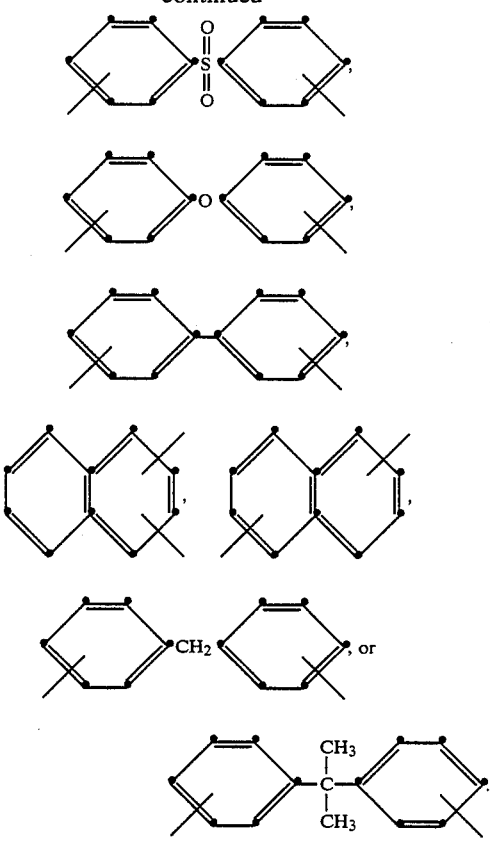

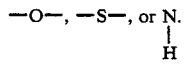

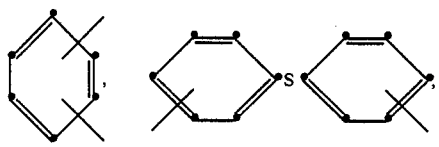

It should be understood that the aromatic moiety may have substituents such as alkyl groups having 1 to 20 carbon atoms, halogen, phenyl, etc.

Especially preferred acids include 1,2-, 1,3-, and 1,4-phenylenedioxydiacetic acid and preferred glycols include 1,2-, 1,3- and 1,4-bis($\beta$-hydroxyethoxy)benzene.

The polyesters according to this invention are derived from a dicarboxylic acid component comprising at least 90 mole % of the hetero-atom-containing acid and at least 75 mole % of the hetero-atom-containing diol described above.

The polyesters of this invention can be prepared by processes normally used to prpeare polyesters, which are well known in the art. Stoichiometric quantities of the dicarboxylic acid or its ester, or diacid chlorides are reacted with the diol. Excesses of the diols of this invention can be used; but since the diols are high boiling and difficult to remove during the polycondensation is exact stoichiometric amounts are not used, it is desirable to use a slightly less-than-theory of the diol of this invention and a small amount of a more volatile glycol having one to five carbon atoms such as ethylene glycol. For example, the reactants for preparation of the polyester can contain about one mole of dicarboxylic acid of this invention, about 0.95 mol of the diol of this invention, and about 0.05 to about 2.5 mols of the volatile diol. During polycondensation under vacuum only a relatively small portion of the diol of the subject invention is removed such that the diol portion of final polyester will contain at least 75% of the diol of subject invention.

In general, the method of preparation involves combination of reactants, followed by heating at about 150°–250° C. with stirring under an inert atmosphere and polycondensing at about 210°–290° C. at reduced pressure with stirring. Useful catalysts include titanium and others generally used in preparing high molecular weight polyesters.

The I.V. (inherent viscosity) of the polyesters generally is within the range of about 0.30 to about 1.50. The glass transition temperature is generally within the range of about 10° C. to about 160° C.

If desired, conventional additives such as dyes, pigments stabilizers, plasticizers, fillers, etc., may be added to the compositions in the usual amounts.

Film or sheet material made from the compositions of the present invention is strong, flexible and clear. It may be formed into articles such as wrappers, bags, bottles, and the like. Such articles are found to have improved gas barrier properties as determined by oxygen permeability properties, and are especially useful in the packaging of food.

The following examples are submitted for a better understanding of the invention.

In the examples, oxygen permeability is determined in cubic centimeters permeating a 1 mil thick sample, 100 inches square, for a 24-hour period under an oxygen partial pressure difference of one atmosphere at 30° C. using a MOCON Oxtran 100 instrument. The film actually used to measure permeability is frequently 3–8 mils in thickness, but the permeability is readily converted to a one mill basis using conventional calculations. Carbon dioxide permeability is determined at 30° C. using a MOCON Permatran C.

The polyesters used in the following examples are prepared by normal polymerization procedures.

EXAMPLE 1

This example describes a polyester prepared from 1,3-phenylenedioxydiacetic acid and 1,4-bis(β-hydroxyethoxy)benzene. Six preparations are made. Each preparation is carried out the same way of reacting 22.6 g (0.1 mol) of 1,3-phenylenedioxydiacetic acid and 19.8 g (0.1 mol) of 1,4-bis(β-hydroxyethoxy)benzene with 100 ppm titanium from acetyltriisopropyltitanate. The reaction is heated at about 200°–210° C. for about two hours with stirring under nitrogen. Water from the reaction is allowed to distill. The temperature is raised to about 260° C. over a period of about 30 minutes. The pressure of the reaction is reduced to about 0.2 millimeters of mercury and held for one hour. Heat is removed from the reaction and the polyester allowed to cool to room temperature. Inherent viscosities of the six preparations range from 0.5 to 0.58. The six preparations are combined, dried, and extruded into film of about 0.13 mm thick. The film has oxygen and carbon dioxide permeabilities respectively of 0.45 and 4.70 cc mil/100 in.$^2$ 24 hr atmosphere. Tensile strength of the film at break is about 570 kg/cm$^2$ and elongation is about 6%.

EXAMPLE 2

This example describes a polyester prepared from 1,3-phenylenedioxydiacetic acid and 1,3-bis(β-hydroxyethoxy)benzene. It is prepared by reacting 113 g (0.5 mol) of 1,3-phenylenedioxydiacetic acid with 99 L g (0.5 mol) of 1,3-bis(β-hydroxyethoxy)benzene in the presence of 100 ppm of titanium from acetyltriisopropyltitanate. The reaction is heated at about 200°–210° C. for about one hour while stirring under nitrogen. Water from the reaction is allowed to distill. The temperature is raised to about 260° C. over a period of about thirty minutes. The pressure of the reaction is reduced to about 0.2 millimeters of mercury and held for about 1.5 hours during which time a viscous polyester formed. Heat is removed from the reaction and the polyester allowed to cool to room temperature.

The polyester with an inherent viscosity of 0.87 is dryed and extruded into a film about 0.13 mm thick. The film has oxygen and carbon dioxide permeabilities respectively of about 1.00 and 3.55 cc mil/100 sq. in. 24 hr atmosphere. Tensile strength of the film at break is about 422 kg/cm$^2$, and elongation is about 4%.

EXAMPLE 3

Example 2 is repeated in the preparation of a polymer containing about 92 mole % of an acid of the formula

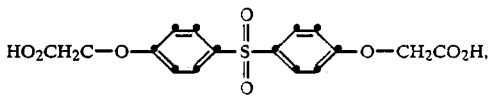

8 mole % terephthalic acid, 78 mole % of a diol of the formula

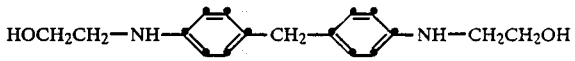

and 22 mole % ethylene glycol. Relatively low oxygen and carbon dioxide permeabilities are obtained.

All inherent viscosities are determined at 25° C. in a (60/40 by weight) mixture of phenol/tetrachloroethane at a concentration of 0.5 g/100 ml. The glass transition temperatures are determined with a Perkin-Elmer DSC-2 differential scanning calorimeter at a heating rate of 20° C./min.

Unless otherwise specified, all parts, ratios, percentages, etc., are by weight.

The invention has been described in detail with particular reference to preferred embodiments thereof, but it will be understood that variations and modifications can be effected within the spirit and scope of the invention.

We claim:

1. A polyester prepared by reacting a dicarboxylic acid component comprising at least 90 mole % of an acid of the general formula

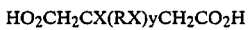

where y=zero or one, and at least 75 mole % of a diol of the general formula

wherein R in each of said formulas is an aromatic moiety comprising 6 to 24 carbon atoms and X in each of the above formulas is

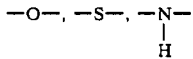

2. A polyester according to claim 1 wherein X in the formula for said acid is —O—.

3. A polyester according to claim 1 wherein X in the formula for said diol is —O—.

4. A polyester according to claim 1 wherein X in both the formulas for said acid and said diol is —O—.

5. A polyester according to claim 1 wherein said acid is selected from the group consisting of 1,2-, 1,3-, and 1,4-phenylenedioxydiacetic acid.

6. A polyester according to claim 1 wherein said diol is selected from the group consisting of 1,2-, 1,3-, and 1,4-bis(β-hydroxyethoxy)benzene.

7. A polyester according to claim 1 wherein said acid is selected from the group consisting of 1,2-, 1,3-, and 1,4-phenylenedioxydiacetic acid and said diol is selected from the group consisting of 1,2-, 1,3-, and 1,4-bis(β-hydroxyethoxy)benzene.

8. A polyester according to claim 1 wherein R in at least one of said formulas is

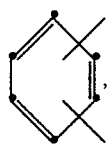 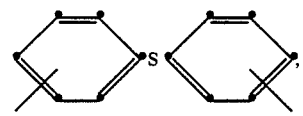

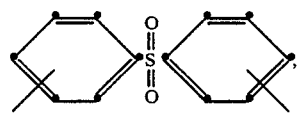

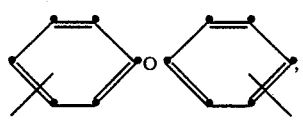

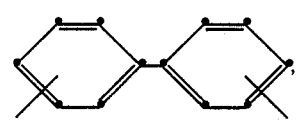

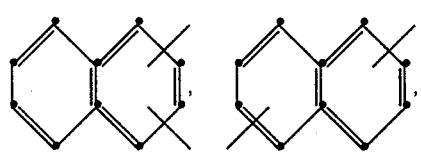

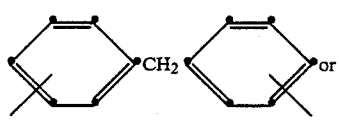

-continued

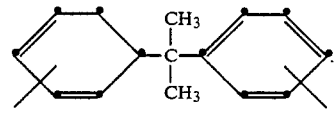

9. A polyester according to claim 1 wherein R in both of said formulas is

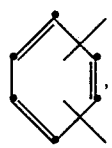 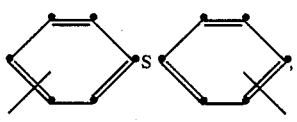

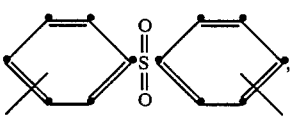

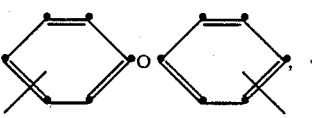

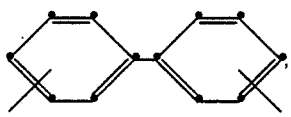

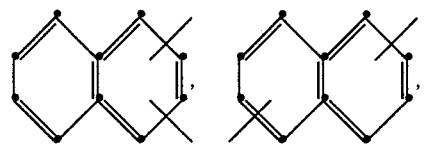

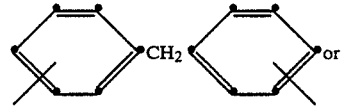

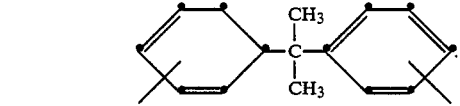

10. Sheet material comprising the polyester defined in claim 1.

11. A container comprising the polyester defined in claim 1.

* * * * *